United States Patent
Saito et al.

(10) Patent No.: US 7,867,664 B2
(45) Date of Patent: Jan. 11, 2011

(54) DIAGNOSTIC APPARATUS AND DIAGNOSTIC METHOD FOR FUEL CELL

(75) Inventors: Norihiko Saito, Susono (JP); Masaaki Kondo, Owariasahi (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 124 days.

(21) Appl. No.: 11/976,259

(22) Filed: Oct. 23, 2007

(65) Prior Publication Data

US 2008/0220299 A1 Sep. 11, 2008

Related U.S. Application Data

(63) Continuation of application No. 10/715,458, filed on Nov. 19, 2003, now abandoned.

(30) Foreign Application Priority Data

Nov. 27, 2002 (JP) .............................. 2002-344416

(51) Int. Cl.
H01M 8/04 (2006.01)
(52) U.S. Cl. .................. 429/444; 429/428; 429/430; 429/433; 429/443; 702/108; 700/286
(58) Field of Classification Search .................. None
See application file for complete search history.

(56) References Cited

U.S. PATENT DOCUMENTS

| | | | |
|---|---|---|---|
| 6,096,449 A | 8/2000 | Fuglevand et al. | |
| 6,447,939 B1 | 9/2002 | Iwasaki | |
| 6,524,733 B1 | 2/2003 | Nonobe | |
| 6,528,192 B2 | 3/2003 | Lacy et al. | |
| 6,562,501 B1* | 5/2003 | Nagamiya et al. | 429/25 |
| 6,620,538 B2 | 9/2003 | Bai et al. | |
| 7,166,379 B2 | 1/2007 | Hallum et al. | |
| 2002/0025464 A1* | 2/2002 | Breuer | 429/22 |
| 2002/0031692 A1 | 3/2002 | Fuglevand et al. | |
| 2003/0003334 A1 | 1/2003 | Yoshizawa et al. | |
| 2004/0054483 A1* | 3/2004 | Gopal et al. | 702/63 |
| 2004/0137291 A1* | 7/2004 | Smedley et al. | 429/22 |

FOREIGN PATENT DOCUMENTS

| | | |
|---|---|---|
| DE | 100 07 973 A | 9/2000 |
| DE | 101 58 581 A1 | 6/2002 |
| DE | 101 61 234 A1 | 7/2002 |

(Continued)

*Primary Examiner*—Ula C Ruddock
*Assistant Examiner*—Tony Chuo
(74) *Attorney, Agent, or Firm*—Kenyon & Kenyon LLP (57) ABSTRACT

According to an aspect of the invention, a diagnostic apparatus which diagnoses a state of the fuel cell includes an operation device which is used for operating the fuel cell; an operational state detecting portion which detects a change in an operational state of the fuel cell; a device control portion which controls the operation device such that the fuel cell is operated according to at least one predetermined operation pattern; and a diagnostic portion which diagnoses the state of the fuel cell based on the change in the operational state of the fuel cell that is detected by the change in the operational state detecting portion when the fuel cell is operated by the device control portion according to the at least one predetermined operation pattern, and the at least one predetermined operation pattern.

20 Claims, 7 Drawing Sheets

FOREIGN PATENT DOCUMENTS

| | | |
|---|---|---|
| JP | 09-245826 A | 9/1997 |
| JP | 11-195423 A | 7/1999 |
| JP | 2001-023667 A | 1/2001 |
| JP | 2002-083622 A | 3/2002 |
| JP | 2002-175821 A | 6/2002 |
| JP | 2002-231295 A | 8/2002 |

* cited by examiner

| | DETERIORATION OF IV CHARACTERISTIC (BETWEEN TERMINALS) | DETERIORATION OF IV CHARACTERISTIC (DECREASE IN VOLTAGE IN CELL) | DECREASE IN CELL VOLTAGE IN OPEN STATE | EXCESSIVE SPEED AT WHICH VOLTAGE IS DECREASED IN OPEN STATE WHEN GAS SUPPLY IS STOPPED | DECREASE IN INTERTERMINAL VOLTAGE IN OPEN STATE | EXCESSIVE INTERNAL RESISTANCE |
|---|---|---|---|---|---|---|
| CROSS-LEAK DUE TO DETERIORATION OF MEMBRANE | × | O | O | O | △ | × |
| DETERIORATION OF CATALYST | △ | O | ? | × | ? | × |
| SHORT CIRCUIT INSIDE MODULE | × | ? | O | O | × | × |
| CONTACT FAILURE OF CELL MONITOR TERMINAL | × | × | O | × | × | × |
| ABNORMALITY OF CELL MONITOR SUBSTRATE | × | O | × | × | O | × |
| CONTAMINATION (METALLIC ION) | × | O | △ | × | × | × |
| INSUFFICIENCY OF AIR (SYSTEM SIDE) | O | O | △ | × | △ | × |
| INSUFFICIENCY OF HYDROGEN (SYSTEM SIDE) | O | O | O | △ | △ | × |
| DRY UP (INSUFFICIENT HUMIDIFICATION) | O | O | △ | × | O | O |
| DRY UP (INSUFFICIENT COOLING) | × | O | △ | × | O | O |
| CLOGGING WITH FOREIGN MATERIAL (ANODE) | × | O | △ | △ | △ | × |
| CLOGGING WITH FOREIGN MATERIAL (CATHODE) | × | O | △ | △ | △ | × |
| FLOODING (ANODE) | × | O | △ | △ | △ | × |
| FLOODING (CATHODE) | × | O | △ | △ | △ | × |

FIG. 5B

| | EXCESSIVE INCREASE IN EXHAUST GAS TEMPERATURE IN AIR SYSTEM | EXCESSIVE INFLUENCE OF CHANGE IN SUPPLY AMOUNT OF HYDROGEN | EXCESSIVE INFLUENCE OF CHANGE IN SUPPLY AMOUNT OF AIR | EXCESSIVE INFLUENCE OF DIFFERENTIAL PRESSURE BETWEEN HYDROGEN AND AIR | EXCESSIVE INFLUENCE OF CHANGE IN HUMIDIFICATION AMOUNT | EXCESSIVE INFLUENCE OF CHANGE IN TEMPERATURE |
|---|---|---|---|---|---|---|
| CROSS-LEAK DUE TO DETERIORATION OF MEMBRANE | × | × | ○ | ○ | × | × |
| DETERIORATION OF CATALYST | × | × | × | × | × | × |
| SHORT CIRCUIT INSIDE MODULE | × | × | × | × | × | × |
| CONTACT FAILURE OF CELL MONITOR TERMINAL | × | × | × | × | × | × |
| ABNORMALITY OF CELL MONITOR SUBSTRATE | × | × | × | × | × | × |
| CONTAMINATION (METALLIC ION) | × | × | × | × | × | × |
| INSUFFICIENCY OF AIR (SYSTEM SIDE) | × | × | ○ | × | × | × |
| INSUFFICIENCY OF HYDROGEN (SYSTEM SIDE) | × | ○ | × | × | × | × |
| DRY UP (INSUFFICIENT HUMIDIFICATION) | ○ | × | × | × | ○ | ○ |
| DRY UP (INSUFFICIENT COOLING) | × | × | × | × | ○ | ○ |
| CLOGGING WITH FOREIGN MATERIAL (ANODE) | × | ○ | ○ | × | × | × |
| CLOGGING WITH FOREIGN MATERIAL (CATHODE) | × | × | × | × | × | × |
| FLOODING (ANODE) | × | ○ | × | × | ○ | ○ |
| FLOODING (CATHODE) | × | × | ○ | × | ○ | ○ |

FIG. 6

DIAGNOSTIC APPARATUS AND DIAGNOSTIC METHOD FOR FUEL CELL

INCORPORATION BY REFERENCE

This is a continuation of application Ser. No. 10/715,458 filed 19 Nov. 2003 — now abandoned, which claims priority to Japanese Patent Application No. 2002-344416 filed 27 Nov. 2002, the contents of which, including the specification, drawings and abstract, are incorporated herein by reference in their entirety.

BACKGROUND OF THE INVENTION

1. Field of the Invention

The invention relates to a diagnostic apparatus and a diagnostic method for a fuel cell and, more particularly, to a diagnostic apparatus and a diagnostic method for diagnosing a state of a fuel cell.

2. Description of the Related Art

Heretofore, there has been proposed a fuel cell system of this type which makes a determination on an abnormal operational state such as excessiveness or scarceness of water contained in a fuel cell stack (e.g., Japanese Patent Application Laid-Open No. 9-245826 (FIG. 1, FIG. 2)). In this system, time-dependent change patterns of a voltage in a cell or a cell block constituting the fuel cell stack are measured and stored in advance as to various operational conditions, and a determination on an operational state of the fuel cell stack is made by comparing an actual time-dependent pattern with the stored patterns.

In such a fuel cell system, an abnormality of the fuel cell stack is not limited to excessiveness or scarceness of water contained in a fuel cell stack, and a phenomenon caused by such an abnormality is not limited to abnormal voltage behavior in the cell or the cell block in the fuel cell stack. Therefore, since the operational state is determined based on the voltage behavior, an erroneous determination may be made. Particularly, when other abnormalities of the fuel cell stack are to be determined in addition to the aforementioned abnormalities, an appropriate determination cannot be made.

SUMMARY OF THE INVENTION

An object of a diagnostic apparatus and a diagnostic method for a fuel cell according to the invention is to more accurately determine a state of the fuel cell. It is another object of the diagnostic apparatus and the diagnostic method for a fuel cell according to the invention to more accurately determine plural abnormalities that may occur in the fuel cell. It is a further object of the diagnostic apparatus for a fuel cell according to the invention to diagnose the state of the fuel cell while the fuel cell is held in operation without operating a fuel gas supply system or a cooling system installed in a moving object.

In order to achieve at least part of the aforementioned objects, the diagnostic apparatus and the diagnostic method for a fuel cell according to the invention are provided as follows.

According to an aspect of the invention, a diagnostic apparatus which diagnoses a state of the fuel cell includes an operation device which is used for operating the fuel cell; an operational state detecting portion which detects a change in an operational state of the fuel cell; a device control portion which controls the operation device such that the fuel cell is operated according to at least one predetermined operation pattern; and a diagnostic portion which diagnoses the state of the fuel cell based on the change in the operational state of the fuel cell that is detected by the operational state detecting portion when the fuel cell is operated by the device control portion according to the at least one predetermined operation pattern, and the at least one predetermined operation pattern.

In the diagnostic apparatus according to the aforementioned aspect, the fuel cell is operated according to the at least one predetermined operation pattern, and the state of the fuel cell is diagnosed based on the change in the operational state of the fuel cell that is detected when the fuel cell is operated, and the at least one predetermined operation pattern. Therefore, it is possible to diagnose the state of the fuel cell accurately, as compared with a case where the state of the fuel cell is diagnosed based on only voltage behavior.

In the diagnostic apparatus according to the aforementioned aspect, the diagnostic portion may diagnose the state of the fuel cell by comparing the change in the operational state of the fuel cell corresponding to each of the operation patterns, which is detected by the operational state detecting portion when the fuel cell is operated by the device control portion according to the at least one predetermined operation pattern, with a change in a normal operational state of the fuel cell corresponding to each of the operation patterns, which is detected by the operational state detecting portion when the fuel cell that normally functions is operated by the device control portion according to the at least one predetermined operation pattern. Also, a relationship between the state of the fuel cell, and presence or absence of an abnormality in the change in the operational state of the fuel cell corresponding to each of the operation patterns may be set in the diagnostic portion in advance.

In the diagnostic apparatus according to the aforementioned aspect, the operational state detecting portion may detect, as the operational state of the fuel cell, an output current and an output voltage of the fuel cell, and the diagnostic portion may diagnose the state of the fuel cell based on the detected output current and the detected output voltage. Thus, it is possible to more accurately diagnose an abnormality which causes characteristic behavior of the output current and the output voltage, among abnormalities that may occur in the fuel cell.

In the diagnostic apparatus according to the aforementioned aspect, the operational state detecting portion may detect, as the operational state of the fuel cell, an interterminal voltage and/or a cell voltage when the fuel cell is in an open state, and the diagnostic portion may diagnose the state of the fuel cell based on the detected interterminal voltage and/or the detected cell voltage. Thus, it is possible to more accurately diagnose an abnormality which causes characteristic behavior of the interterminal voltage and/or the cell voltage when the fuel cell is in the open state, among abnormalities that may occur in the fuel cell. The "cell voltage" includes a voltage in a cell, and a voltage in a cell block including plural cells.

In the diagnostic apparatus according to the aforementioned aspect, the operation device may be a gas supply device which is used for supplying a fuel gas and/or an oxidative gas to the fuel cell, and the device control portion may control, according to one of the at least one predetermined operation pattern, the gas supply device such that the fuel gas and/or the oxidative gas is supplied to the fuel cell according to a predetermined supply pattern. Also, in the diagnostic apparatus, the predetermined supply pattern may include one of a predetermined pattern of increasing/decreasing a flow amount of the fuel gas and/or the oxidative gas, a predetermined pattern of increasing/decreasing a supply pressure, and a predetermined pattern of increasing/decreasing a degree of humidification. Thus, it is possible to more accurately diagnose the state of the fuel cell, which is caused by an increase/decrease in the flow amount of the fuel gas and/or the oxidative gas, an increase/decrease in the supply pressure, or an increase/decrease in the degree of humidification.

In the diagnostic apparatus according to the aforementioned aspect, the operational state detecting portion may detect, as the operational state of the fuel cell, an internal resistance of the fuel cell, and the diagnostic portion may diagnose the state of the fuel cell based on the detected internal resistance. Thus, it is possible to more accurately diagnose an abnormality which causes characteristic behavior of the internal resistance of the fuel cell, among abnormalities which may occur in the fuel cell.

In the diagnostic apparatus according to the aforementioned aspect, the operation device may be a temperature adjusting device which is used for adjusting an operation temperature of the fuel cell, and the device control portion may control, according to one of the at least one predetermined operation pattern, the temperature adjusting device such that the fuel cell is operated according to a predetermined temperature pattern. Thus, it is possible to more accurately diagnose the state of the fuel cell, which is caused by a change in the operation temperature of the fuel cell.

In the diagnostic apparatus according to the aforementioned aspect, the operational state detecting portion may detect, as the operational state of the fuel cell, one of a temperature of the fuel cell, an exhaust gas temperature in a fuel gas system, and an exhaust gas temperature in an oxidative gas system, and the diagnostic portion may diagnose the state of the fuel cell based on one of the temperature of the fuel cell, the exhaust gas temperature in the fuel gas system, and the exhaust gas temperature in the oxidative gas system, which is detected. Thus, it is possible to more accurately diagnose an abnormality which causes characteristic behavior of one of the temperature of the fuel cell, the exhaust gas temperature in the fuel gas system, and the exhaust gas temperature in the oxidative gas system.

In the diagnostic apparatus according to the aforementioned aspect, the diagnostic portion may determine that there is a mechanical failure or deterioration due to a secular change when an output voltage of the fuel cell is less than a predetermined value in a case where the fuel cell is operated according to the at least one predetermined operation pattern. Thus, it is possible to make a diagnosis of a mechanical failure or deterioration due to a secular change.

In a diagnostic apparatus for a fuel cell according to another aspect of the invention, which is used for diagnosing a state of a fuel cell installed in a moving object as a power source, the operation device may include a device installed in the moving object, the operational state detecting portion may include a moving object detecting portion which is installed in the moving object, and which detects a state as the operational state of the fuel cell, the device control portion may be able to be connected to a control system which is installed in the moving object for controlling an operation of the fuel cell, and may control the operation device by giving an instruction to the control system, and the operation device may include a power adjusting portion which adjusts power generated by the fuel cell. Thus, it is possible to diagnose the fuel cell installed in the moving object while the moving object is stopped. In the diagnostic apparatus for a fuel cell according to the aforementioned aspect of the invention, the power adjusting portion may be connected to an output terminal of the fuel cell, and may adjust the power generated by the fuel cell by absorbing or consuming the power.

The diagnostic apparatus for a fuel cell according to the aforementioned aspect, which is used for diagnosing the fuel cell installed in the moving object, may further include a fuel gas supply portion which supplies the fuel cell with a fuel gas that is used for power generation of the fuel cell, instead of a fuel gas supply system which is installed in the moving object for supplying the fuel cell with the fuel gas, or may further include a cooling portion which cools the fuel cell, instead of a cooling system which is installed in the moving object for cooling the fuel cell. Thus, even when an abnormality occurs in the fuel gas supply system or the cooling system which is installed in the moving object, it is possible to diagnose the fuel cell installed in the moving object.

According to a further aspect of the invention, a diagnostic method for a fuel cell, which is a method for diagnosing a state of the fuel cell, includes the steps of: (a) operating the fuel cell according to at least one predetermined operation pattern; (b) detecting a change in an operational state of the fuel cell corresponding to each of the operation patterns when the fuel cell is operated according to the at least one predetermined operation pattern; and (c) diagnosing the state of the fuel cell based on the detected change in the operational state and the at least one predetermined operation pattern.

In the diagnostic method according to the aforementioned aspect, the change in the operational state of the fuel cell when the fuel cell is operated according to the at least one predetermined operation pattern is detected, and the state of the fuel cell is diagnosed based on the change in the operational state of the fuel cell that is detected when the fuel cell is operated according to the at least one predetermined operation pattern, and the at least one predetermined operation pattern. Therefore, it is possible to more accurately diagnose the state of the fuel cell, as compared with a case where the state of the fuel cell is diagnosed based on only voltage behavior.

In the diagnostic method according to the aforementioned aspect, in the step (c), the state of the fuel cell may be diagnosed by comparing the change in the operational state of the fuel cell corresponding to each of the operation patterns, which is detected when the fuel cell is operated according to the at least one predetermined operation pattern, with a change in a normal operational state of the fuel cell corresponding to each of the operation patterns, which is detected when the fuel cell that normally functions is operated according to the at least one predetermined operation pattern.

In the diagnostic method according to the aforementioned aspect, in the step (a), the fuel cell may be operated according to one of a predetermined pattern of increasing/decreasing a flow amount of a fuel gas and/or an oxidative gas that is supplied to the fuel cell, a predetermined pattern of increasing/decreasing a supply pressure, and a predetermined pattern of increasing/decreasing a degree of humidification, as one of the operation patterns. Thus, it is possible to more accurately diagnose the state of the fuel cell, which is caused by an increase/decrease in the flow amount of the fuel gas and/or the oxidative gas, an increase/decrease in the supply pressure, or an increase/decrease in the degree of humidification.

In the diagnostic method according to the aforementioned aspect, in the step (b), one of i) an output current and an output voltage of the fuel cell, ii) an interterminal voltage or a cell voltage when the fuel cell is in an open state, iii) an internal resistance of the fuel cell, iv) a temperature of the fuel cell, v) an exhaust gas temperature in a fuel gas system of the fuel cell, and vi) an exhaust gas temperature in an oxidative gas system of the fuel cell may be detected as the operational state. Thus, it is possible to more accurately diagnose an abnormality which causes characteristic behavior of one of i)

the output current and the output voltage of the fuel cell, ii) the interterminal voltage of the cell voltage when the fuel cell is in the open state, iii) the internal resistance of the fuel cell, iv) the temperature of the fuel cell, v) the exhaust gas temperature in the fuel gas system, and vi) the exhaust gas temperature in the oxidative gas system.

DETAILED DESCRIPTION OF THE PREFERRED EMBODIMENTS

Figure 1:
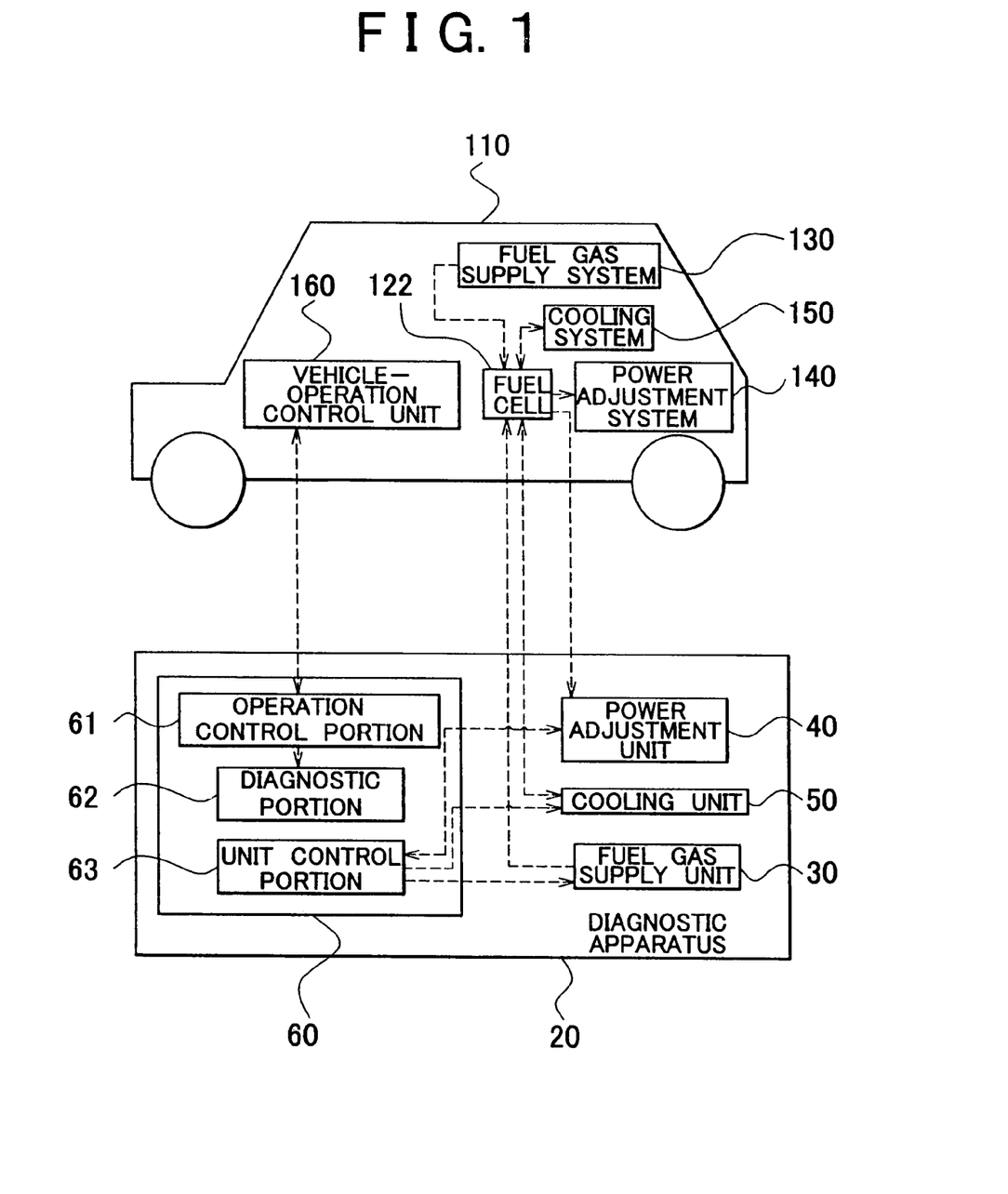
FIG. 1 is a conceptual view exemplifying a constructional concept in diagnosing a state of a fuel cell 122 installed in a vehicle 110 by means of a fuel-cell diagnostic apparatus 20 in accordance with one embodiment of the invention.
Figure 2:
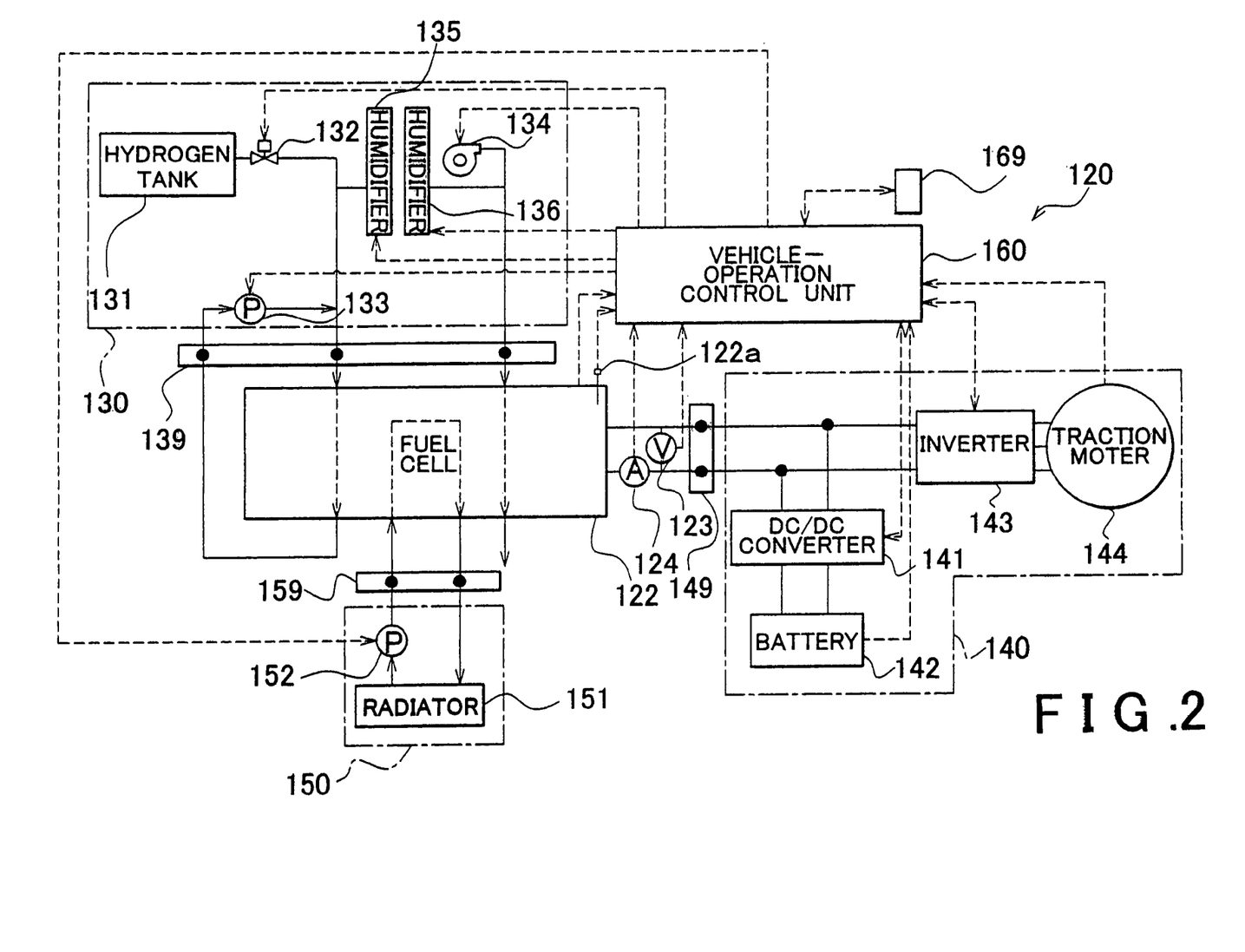
FIG. 2 is a block diagram showing the overall construction of a fuel cell system 120 installed in the vehicle.
Figure 3:
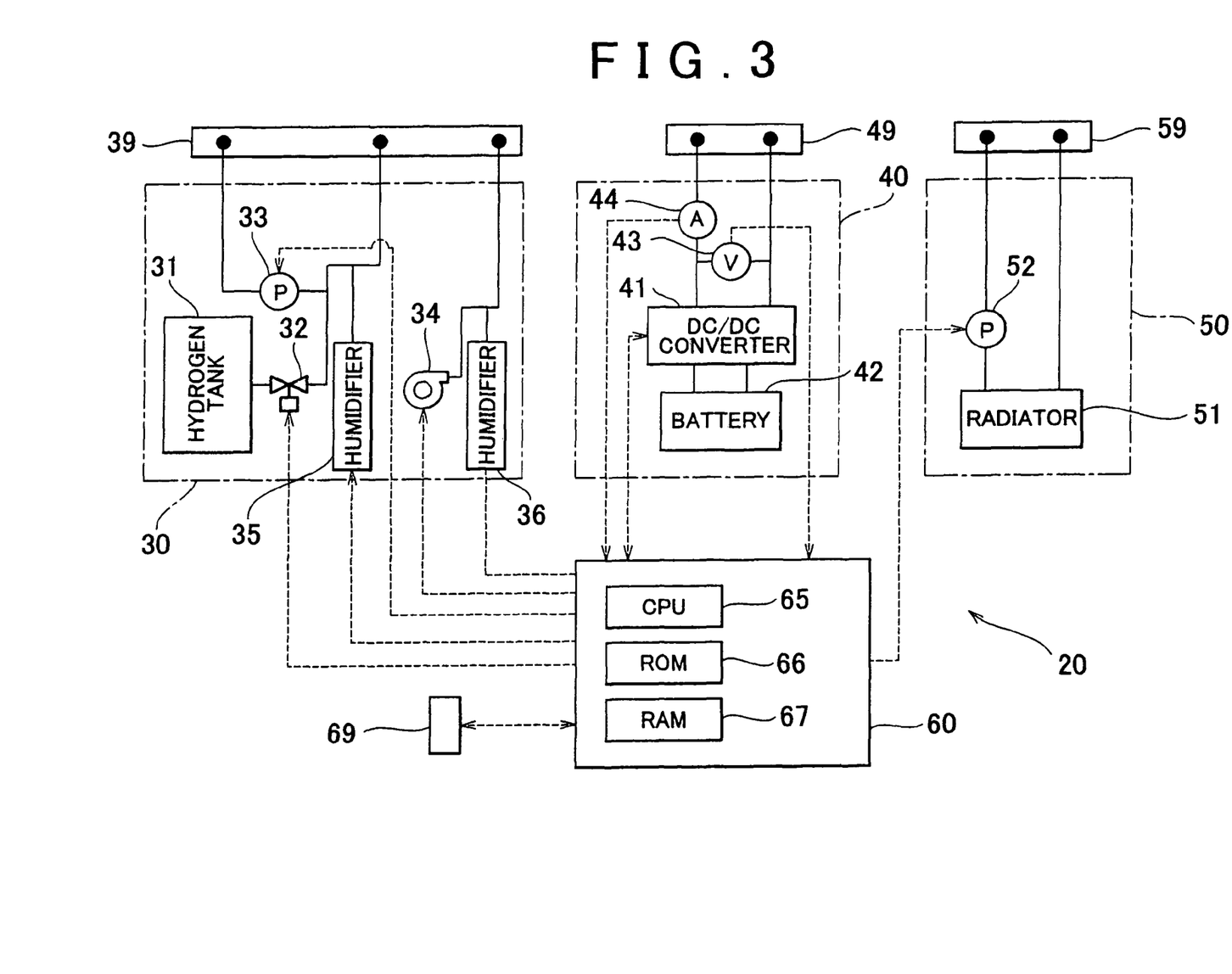
FIG. 3 is a block diagram showing the overall construction of the diagnostic apparatus 20 of the embodiment.

Next, a mode of implementing the invention will be described based on the embodiment thereof. FIG. 1 is a conceptual view exemplifying a constructional concept in diagnosing a state of the fuel cell 122 installed in the vehicle 110 by means of the fuel-cell diagnostic apparatus 20 in accordance with one embodiment of the invention. FIG. 2 is a block diagram showing the overall construction of the fuel cell system 120 installed in the vehicle. FIG. 3 is a block diagram showing the overall construction of the diagnostic apparatus 20 of the embodiment. For convenience of explanation, the construction of the fuel cell system 120 installed in the vehicle 110 will be described first, and then the construction of the fuel-cell diagnostic apparatus 20 of the embodiment will be described in detail.

As shown in FIG. 2, the fuel cell system 120 includes a fuel gas supply system 130 that supplies a fuel cell 122 with hydrogen and air as fuel, a power adjustment system 140 that adjusts power generated by the fuel cell 122 with a view to using the power to drive a vehicle or accumulating the power, a cooling system 150 that cools the fuel cell 122, and a vehicle-operation control unit 160 that controls operation of the fuel cell 122 while controlling a running state of the vehicle.

For example, the fuel cell 122 is constructed as a proton-exchange membrane fuel cell made of a plurality of laminated cells, each of which includes a polymer membrane exhibiting good proton conductivity in a wet state as an electrolytic membrane. Power is generated through an electrochemical reaction that is caused by supplying hydrogen and oxygen respectively to a fuel-electrode-side flow passage and an air-electrode-side flow passage that are formed on opposed sides of the electrolytic membrane.

The fuel gas supply system 130 includes a hydrogen tank 131 that stores high-pressure hydrogen and that is connected to the fuel-electrode-side flow passage of the fuel cell 122 via an adjusting valve 132, a hydrogen pump 133 that causes hydrogen supplied from the hydrogen tank 131 to circulate through a circulation passage including the fuel-electrode-side flow passage of the fuel cell 122, an air supply pump 134 that supplies the air-electrode-side flow passage of the fuel cell 122 with air as an oxidative gas containing oxygen, and humidifiers 135, 136 which humidify hydrogen and air supplied to the fuel cell 122. A fuel gas supply unit fitting portion 139 for fitting a fuel gas supply unit 30 of the fuel-cell diagnostic apparatus 20 of the embodiment is provided in the fuel gas supply system 130 at a position to be connected to the fuel cell 122.

The power adjustment system 140 includes a battery 142 connected to an output terminal of the fuel cell 122 via a DC/DC converter 141, and a traction motor 144 connected to the output terminal of the fuel cell 122 via an inverter 143. The power adjustment system 140 is designed such that the traction motor 144 can consume power and that the battery 142 can be charged with electricity and electricity can be discharged from the battery 142. A power adjustment unit fitting portion 149 for fitting a power adjustment unit 40 of the fuel-cell diagnostic apparatus 20 of the embodiment is provided in the power adjustment system 140 at a position to be connected to the fuel cell 122.

The cooling system 150 is constructed as a circulation passage including a flow passage of coolant for the fuel cell 122. The cooling system 150 includes a radiator 151 that air-cools coolant, and a coolant pump 152 that causes coolant to circulate. By causing coolant cooled by the radiator 151 to circulate through the circulation passage, the cooling system 150 cools the fuel cell 122. A cooling unit fitting portion 159 for fitting a cooling unit 50 of the fuel-cell diagnostic apparatus 20 of the embodiment is provided in the cooling system 150 at a position to be connected to the fuel cell 122.

The vehicle-operation control unit 160 is constructed as a microcomputer mainly composed of a CPU (not shown), and includes an input port, an output port, and a communication port. The vehicle-operation control unit 160 receives, via the input port, signals indicating a cell voltage detected by a voltage sensor for detecting a voltage between cells constituting the fuel cell 122, a fuel cell temperature T detected by a temperature sensor 122a attached to the fuel cell 122, an interterminal voltage V detected by a voltage sensor 123 attached to a power line in the vicinity of an output terminal of the fuel cell 122, an output current I detected by a current sensor 124 attached to the power line in the vicinity of the output terminal of the fuel cell 122, a voltage detected by a voltage sensor (not shown) attached to the DC/DC converter 141, a current detected by a current sensor (not shown) attached to the DC/DC converter 141, a charge/discharge voltage detected by a voltage sensor (not shown) attached to a power line in the vicinity of an output terminal of the battery 142, a charge/discharge current detected by a current sensor (not shown) attached to the power line in the vicinity of the output terminal of the battery 142, a phase current of the traction motor 144 detected by a current sensor (not shown) attached to a power line extending from an inverter 143 to the traction motor 144, a position of a rotor detected by a rotational position sensor (not shown) attached to the traction motor 144, and the like. The vehicle-operation control unit 160 outputs, via the output port, a drive signal for the adjusting valve 132, a drive signal for the hydrogen pump 133, a drive signal for the air supply pump 134, a drive signal for the humidifiers 135, 136, a switching control signal for the DC/DC converter 141, a switching control signal for the inverter 143, a drive signal for the coolant pump 152, and the like. A connector 169 for connection to a control unit 60 of the fuel-cell diagnostic apparatus 20 of the embodiment is connected to the communication port of the vehicle-operation control unit 160.

Next, the construction of the fuel-cell diagnostic apparatus 20 of the embodiment will be described. As shown in FIGS. 1 and 3, the fuel-cell diagnostic apparatus 20 of the embodiment includes the fuel gas supply unit 30 that supplies the fuel cell 122 with hydrogen and air as fuel, the power adjustment unit 40 that adjusts power generated by the fuel cell 122, and the cooling unit 50 that cools the fuel cell 122, instead of the fuel gas supply system 130 of the fuel cell system 120, the power adjustment system 140 of the fuel cell system 120, and the cooling system 150 of the fuel cell system 120, respectively. The fuel-cell diagnostic apparatus 20 also includes the control unit 60 that is connected to the vehicle-operation control unit 160 of the fuel cell system 120 so as to exchange communications therewith and that controls the entire apparatus.

As shown in FIG. 3, the fuel gas supply unit 30 includes a hydrogen tank 31 whose outlet and inlet are provided with adjusting valves 32, a hydrogen pump 33 for causing hydrogen to circulate, an air supply pump 34 for supplying air, and humidifiers 35, 36 for humidifying hydrogen and air that are supplied. When fitted to the fuel gas supply unit fitting portion 139 of the fuel cell system 120 by means of a fuel gas supply system fitting portion 39, the fuel gas supply unit 30 functions substantially in the same manner as the fuel gas supply system 130 of the fuel cell system 120.

The power adjustment unit 40 includes a DC/DC converter 41 capable of raising and lowering a direct-current voltage, and a chargeable/dischargeable battery 42 that is connected to the DC/DC converter 41. When connected to the power adjustment unit fitting portion 149 of the fuel cell system 120 by means of a power adjustment system fitting portion 49, the power adjustment unit 40 can freely charge the battery 42 with power generated by the fuel cell 122. A voltage sensor 43 for detecting a voltage applied to the fuel cell 122 and a current sensor 44 for detecting a current flowing through the fuel cell 122 are attached to the DC/DC converter 41 on the side of the power adjustment system fitting portion 49.

The cooling unit 50 includes a radiator 51 that cools coolant by means of outside air, and a coolant pump 52 for causing coolant to circulate. When fitted to the cooling unit fitting portion 159 by means of a cooling system fitting portion 59, the cooling unit 50 functions substantially in the same manner as the cooling system 150 of the fuel cell system 120.

As shown in FIG. 1, the control unit 60 is functionally composed of an operation control portion 61 that controls operation of the fuel cell 122 by means of the vehicle-operation control unit 160, a diagnostic portion 62 that diagnoses a state of the fuel cell 122 on the basis of a state of the fuel cell 122 that is in operation, and a unit control portion 63 that controls the fuel gas supply unit 30, the power adjustment unit 40, and the cooling unit 50. As shown in FIG. 3, the control unit 60 is hardwarewise constructed as a microcomputer mainly composed of a CPU 65, a ROM 66, and a RAM 67. The control unit 60 receives, via an input port (not shown), signals indicating a voltage detected by the voltage sensor 43, a current detected by the current sensor 44, and the like. The control unit 60 outputs, via an output port (not shown), a drive signal for the adjusting valve 32, a drive signal for the hydrogen pump 33, a drive signal for the air supply pump 34, a switching control signal for the DC/DC converter 41, a drive signal for the coolant pump 52, and the like. A connector 69 that can be connected to the connector 169 connected to the communication port of the vehicle-operation control unit 160 of the fuel cell system 120 is attached to a communication port (not shown) of the control unit 60.

Next, it will be described how a diagnosis of a state of the fuel cell 122 installed in the vehicle 110 is made using the fuel-cell diagnostic apparatus 20 of the embodiment constructed as described above. First to fourth diagnostic patterns are set for the fuel-cell diagnostic apparatus 20 of the embodiment. According to the first diagnostic pattern, a diagnosis is made with the control unit 60 and the vehicle-operation control unit 160 being connected via the connector 69 and the connector 169 and with the power adjustment system fitting portion 49 being fitted to the power adjustment unit fitting portion 149 so that the power adjustment unit 40 is connected to the fuel cell system 120. According to the second diagnostic pattern, a diagnosis is made with the fuel gas supply system fitting portion 39 being fitted to the fuel gas supply unit fitting portion 139 so that the fuel gas supply unit 30 is connected to the fuel cell system 120, in addition to the configuration of the first diagnostic pattern. According to the third diagnostic pattern, a diagnosis is made with the cooling system fitting portion 59 being fitted to the cooling unit fitting portion 159 so that the cooling unit 50 is connected to the fuel cell system 120, in addition to the configuration of the first diagnostic pattern. According to the fourth diagnostic pattern, a diagnosis is made with the fuel gas supply unit 30, the power adjustment unit 40, and the cooling unit 50 being all connected to the fuel cell system 120. That is, the first diagnostic pattern is used when the fuel gas supply system 130 and the cooling system 150 as well as a state of the fuel cell 122 are diagnosed while the fuel gas supply system 130 and the cooling system 150 are held in operation. The second diagnostic pattern is used when there is an abnormality occurring in the fuel gas supply system 130 or when a diagnosis is made without taking the influence of the fuel gas supply system 130 into account. The third diagnostic pattern is used when there is an abnormality occurring in the cooling system 150 or when a diagnosis is made without taking the influence of the cooling system 150 into account. The fourth diagnostic pattern is used when there are abnormalities occurring in the fuel gas supply system 130 and the cooling system 150 or when a diagnosis is made only as to the fuel cell 122 without taking the influences of the fuel gas supply system 130 and the cooling system 150 into account. Only the connection relationship between the fuel gas supply unit 30 or the cooling unit 50 and the fuel cell system 120 is different among the diagnostic patterns, and the same diagnostic process is performed in all the diagnostic patterns. Therefore, hereinafter, the fourth diagnostic pattern will be described.

Figure 4:
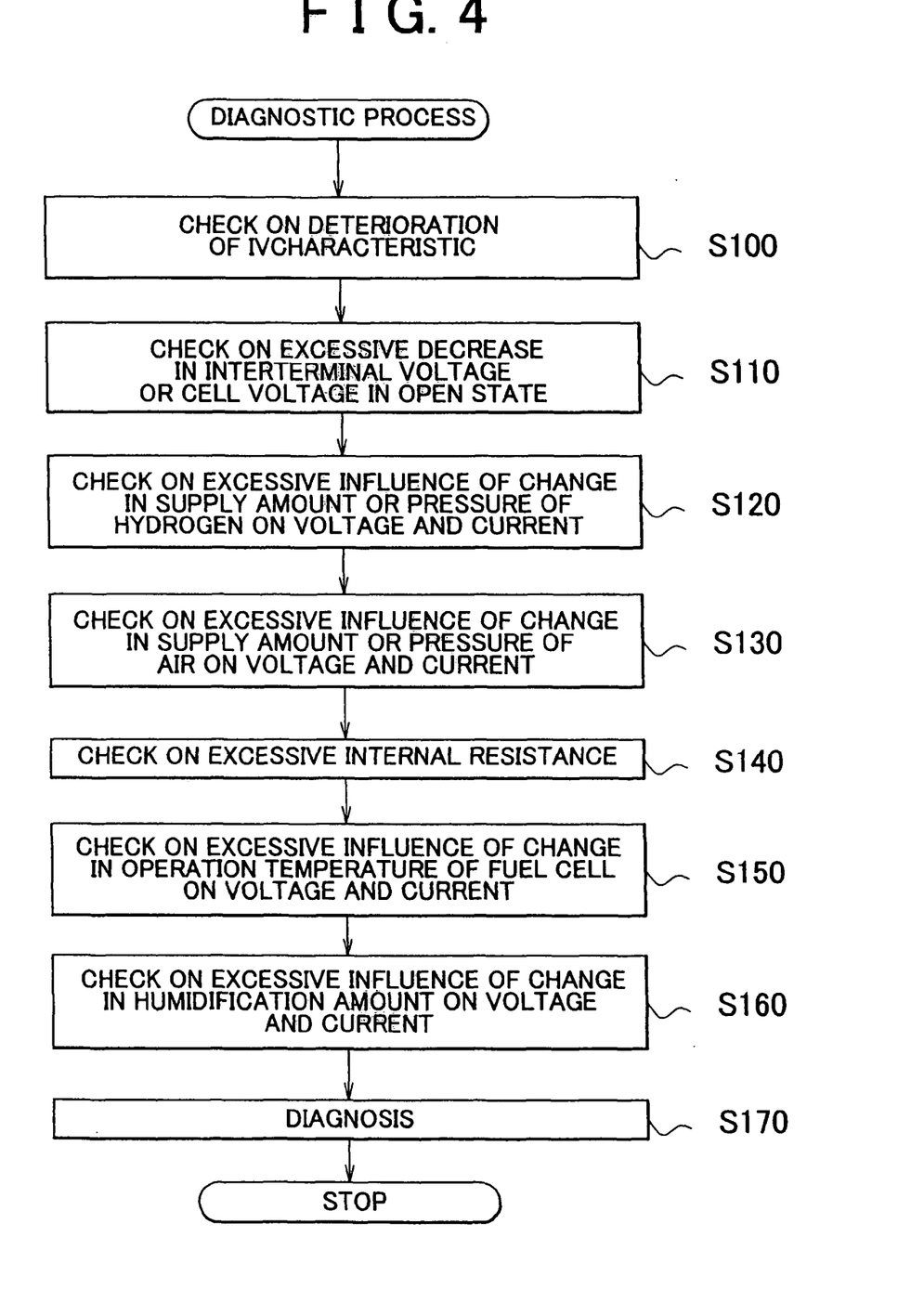
FIG. 4 is a flowchart showing an example of a diagnostic process performed by the fuel-cell diagnostic apparatus 20 according to the embodiment of the invention.

FIG. 4 is a flowchart showing an example of a diagnostic process performed by the control unit 60 in the fuel-cell diagnostic apparatus 20 according to the embodiment of the invention. In the diagnostic process according to the embodiment, plural checks are performed based on behavior of the fuel cell 122 caused by a change in the operational state (step S100 to S160), and then an overall diagnosis of the state of the fuel cell 122 is performed based on results of the checks (step S170). The check items include a check on deterioration of a current/voltage characteristic (hereinafter, referred to as a IV characteristic) of the fuel cell 122 (step S100), a check on an excessive decrease in the interterminal voltage or the cell voltage between the plural cells constituting the fuel cell 122 when the output terminals of the fuel cell 122 are in the open state (step S110), a check on excessive influence of a change in the supply amount or the pressure of hydrogen on a generated current I and a generated voltage V (step S120), a check on excessive influence of a change in the supply amount or the pressure of air on the generated current I and generated voltage V (step S130), a check on an excessive internal resistance (step S140), a check on excessive influence of a change in the operation temperature of the fuel cell 122 on the generated current I and generated voltage V (step S150), a check on excessive influence of a change in a humidification amount for hydrogen and air on the generated current I and the generated voltage V (step S160), and the like. In the embodiment, the flowchart in FIG. 4 shows the order in which the checks are performed. However, the order is not essential, and may be changed. Hereinafter, each of the check items will be described.

Specifically, the check on deterioration of the IV characteristic (step S100) is performed as follows. After the fuel gas supply unit 30, the power adjustment unit 40, and the cooling unit 50 are operated such that the fuel cell 122 fully performs the function in a steady state, the generated current I of the fuel cell 122 is changed using control by the DC/DC converter 41 in the power adjustment unit 40, and the generated voltage V which is changed due to a change in the generated current I is detected. Then, it is determined whether or not a deviation between a relationship between the generated current I and the generated voltage V (characteristic) and the IV characteristic of the fuel cell which normally functions is in an allowable range. In this case, as the generated current I and the generated voltage V, the values detected by the current sensor 44 and the voltage sensor 43 in the power adjustment unit 40 may be used, or the values detected by the current sensor 124 and the voltage sensor 123 may be used.

Specifically, the check on an excessive decrease in the interterminal voltage or the cell voltage when the output terminals of the fuel cell 122 are in the open state (step S110) is performed as follows. While the fuel gas supply unit 30 supplies sufficient hydrogen and air to the fuel cell 122, the generated current I is decreased to value 0 by the power adjustment unit 40. In this state, the voltage detected by the voltage sensor 43 or the voltage sensor 143 (the interterminal voltage of the fuel cell 122) and the cell voltage detected by the voltage sensor (not shown) for detecting the voltage between the cells constituting the fuel cell 122 are compared with the interterminal voltage and the cell voltage which are detected when the fuel cell that normally functions is in the same state. Thus, it is determined whether or not a decrease in the interterminal voltage or the cell voltage is in an allowable range. The cell voltage may be the voltage in each cell or may be the voltage in a cell block including plural cells.

Specifically, the check on excessive influence of a change in the supply amount or the pressure of hydrogen on the generated current I and the generated voltage V (step S120) is performed as follows. After the fuel cell 122 is brought into the steady operational state, the opening of the adjusting valve 32 of the fuel gas supply unit 30 is changed, and the generated current I and the generated voltage V when the amount and the pressure of hydrogen supplied to the fuel cell 122 are changed are detected. Then, a degree of a change in a relationship between the generated current I and the generated voltage V is compared with a degree of a change in a relationship between the generated current I and the generated voltage V when the fuel cell that normally functions is operated in the same manner. Thus, it is determined whether or not a deviation between both the degrees is in an allowable range. In this case, when the check is performed by changing only the supply amount of hydrogen without changing the pressure of hydrogen, or by changing only the pressure of hydrogen without changing the supply amount of hydrogen, influence of the change in the supply amount of hydrogen or influence of the change in the supplied pressure can be checked.

The check on excessive influence of a change in the supply amount or the pressure of air on the generated current I and the generated voltage V (step S130) is performed in the same manner as the aforementioned check on excessive influence of a change in the supply amount or the pressure of hydrogen. The step S120 and step S130 can be performed separately, or the step S120 and step S130 can be combined so as to be performed simultaneously. When the step S120 and step S130 are combined and performed simultaneously, a change in the supply amount of hydrogen, a change in the pressure of hydrogen, a change in the supply amount of air, and a change in the pressure of air can be combined in various manners. Thus, the check can be performed by various methods, for example, by increasing or decreasing the supply amount of hydrogen and the supply amount of air while maintaining a mole ratio between hydrogen and oxygen in electrochemical reaction in the fuel cell 122, by increasing or decreasing one of the supply amount of hydrogen and the supply amount of air without changing the other supply amount, or by increasing/decreasing the deviation between the pressure of hydrogen and the pressure of air.

Specifically, the check on excessive internal resistance (step S140) is performed as follows. The internal resistance is calculated based on the generated current I and the generated voltage V of the fuel cell 122. Then, it is determined whether or not a value by which the internal resistance is higher than the internal resistance that is estimated considering elapsed time since start of use is in an allowable range.

Specifically, the check on excessive influence of a change in the operation temperature of the fuel cell 122 on the generated current I and generated voltage V (step S150) is performed as follows. The temperature of the fuel cell 122 is changed by performing drive control of the coolant pump 52 in the cooling unit 50 based on the fuel cell temperature detected by the temperature sensor (not shown) fitted to the fuel cell 122, and the generated current I and the generated voltage V are detected while the temperature of the fuel cell 122 is changed. A degree of a change in a relationship between the generated current I and the generated voltage V is compared with a degree of a change in a relationship between the generated current I and the generated voltage V which are detected when the fuel cell that normally functions is in the same state. Thus, it is determined whether or not a deviation between both the degrees is in an allowable range. The temperature of the fuel cell 122 can be obtained by inputting the signal sent from the temperature sensor (not shown) fitted to the fuel cell 122 to the control unit 60 via the vehicle-operation control unit 160.

The check on excessive influence of a change in the humidification amount for hydrogen and air on the generated current I and the generated voltage V (step S160) is performed as follows. The humidification amount for hydrogen and air that are supplied to the fuel cell 122 is changed, and the generated current I and the generated voltage V are detected while the humidification amount is changed. A degree of a change in a relationship between the generated current I and the generated voltage V is compared with a degree of a change in a relationship between the generated current I and the generated voltage V which are detected when the fuel cell that normally functions is in the same state. Thus, it is determined whether or not a deviation between both the degrees is in an allowable range.

Figure 5A:
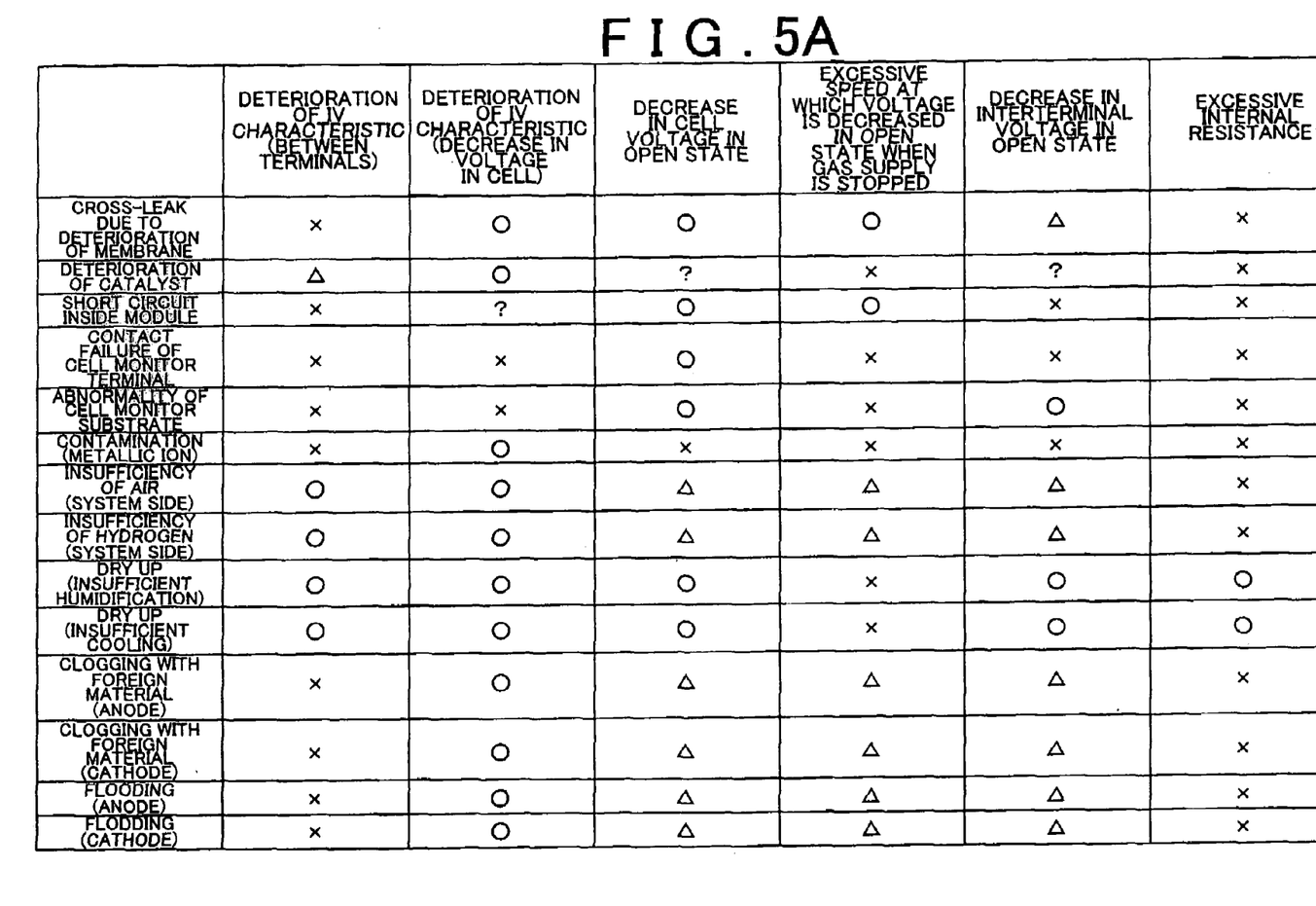
FIGS. 5A and 5B are tables, each describing an example of combinations of states of the fuel cell and check results.
Figure 5B:
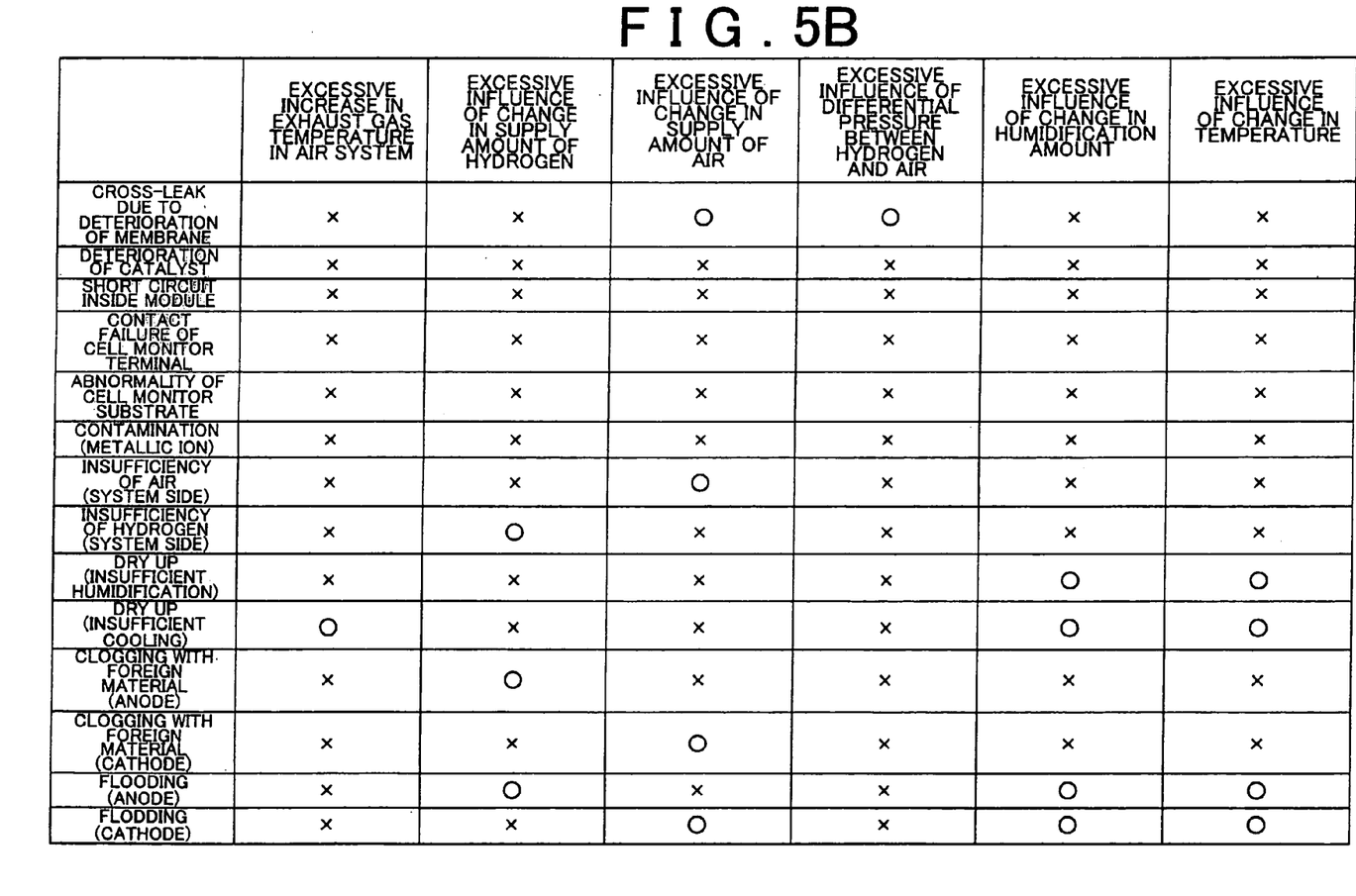
Figure 6:
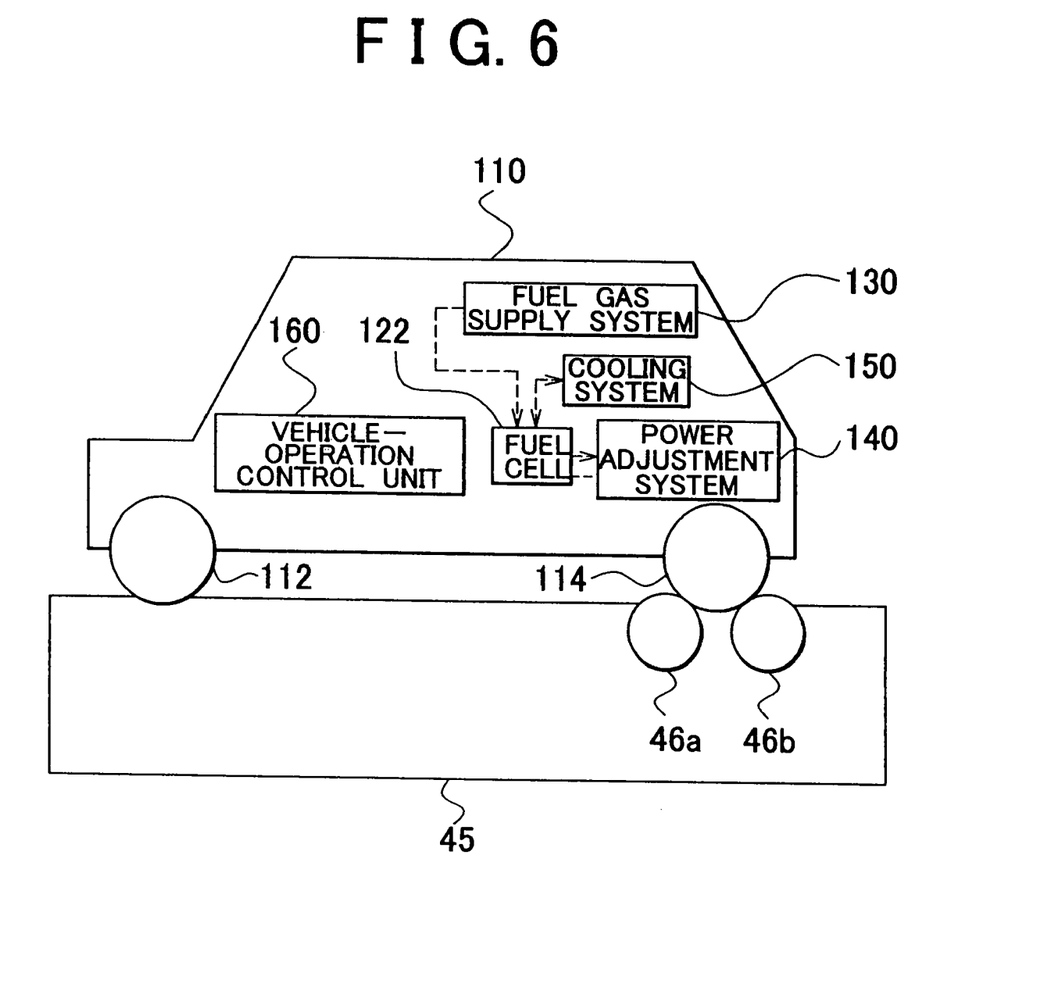
FIG. 6 is an explanatory view showing a drive unit 45 as an example.

In the embodiment, a diagnosis is made in step S170 as follows. The aforementioned checks are performed while the fuel cell is in various states including abnormalities and the like. Results of the checks are stored as database in advance. The diagnosis is made by deriving a state which corresponds to the results of the checks performed on the fuel cell 122 under the diagnosis. FIGS. 5A and 5B are tables, each describing an example of combinations of states of the fuel cell and check results. In FIGS. 5A and 5B, a circle signifies that it is determined that deterioration or excessive influence exists. A mark x signifies that it is determined that deterioration or excessive influence does not exist. A triangle signifies that deterioration or excessive influence may or may not exist. A question mark signifies that a determination is difficult to make. In the case where the diagnosis is made, the triangle and the question mark may be regarded as either the circle or the mark x. In the embodiment, when a predetermined output voltage is not obtained even after the fuel cell is operated according to all operation patterns for check in the case where the diagnosis is made, it is determined that there is a mechanical failure other than "a contact failure of a cell monitor terminal" and "an abnormality of a cell monitor substrate", or deterioration occurs since the fuel cell is used for a long time. The combinations of the states of the fuel cell and the check results shown in FIGS. 5A and 5B are exemplary, and the combinations thereof vary depending on the type, characteristics, and the like of the fuel cell.

In the fuel-cell diagnostic apparatus 20 of the embodiment described hitherto, the detected values such as the generated current I and the generated voltage V which are detected when the fuel cell 122 is operated according to the operation pattern corresponding to each check item, that is, the operation pattern for check with the detected values which are obtained when the fuel cell that normally functions is similarly operated according to the operation pattern for check, whereby the diagnosis of the state of the fuel cell 122 can be made. Particularly, since the plural checks are performed, and the results of the plural checks are used to make the diagnosis of the state of the fuel cell 122, the diagnosis of the state of the fuel cell 122 can be made more accurately. Further, when the predetermined output voltage is not obtained even after the fuel cell 122 is operated according to the operation pattern for check, it can be determined that there is a mechanical failure or deterioration occurs since the fuel cell is used for a long period.

The fuel-cell diagnostic apparatus 20 of the embodiment described hitherto can diagnose the state of the fuel cell 122 while the fuel cell 122 is held in operation during stoppage of the vehicle 110, without removing the fuel cell 122 installed in the vehicle 110 therefrom. Moreover, even if there is an abnormality occurring in the fuel gas supply system 130 or the cooling system 150 of the fuel cell system 120, the fuel-cell diagnostic apparatus 20 can diagnose the state of the fuel cell 122 while the fuel cell 122 is held in operation with the fuel gas supply unit 30 or the cooling unit 50 being connected thereto.

In the fuel-cell diagnostic apparatus 20 of the embodiment, all the checks in step S100 to step S160 are performed, and then the diagnosis of the state of the fuel cell 122 is made. However, all the checks are not necessarily performed, and only part of the checks may be performed. Obviously, a check other than the checks in the embodiment may be performed. Various examples of the check other than those in the embodiment include a check on excessive influence of a change in an exhaust gas temperature in a hydrogen system or an exhaust gas temperature in an air system on the generated current I and the generated voltage V, excessive influence of a change in a back pressure in the hydrogen system or a back pressure in the air system on the generated current I and the generated voltage V, and excessive influence of vibration of the vehicle 110 on the generated current I and the generated voltage V.

In the fuel-cell diagnostic apparatus 20 of the embodiment, the DC/DC converter 41 and the battery 42 are employed as the power adjustment unit 40. However, as long as power generated by the fuel cell 122 can be adjusted, a power-consuming load can be employed instead of the battery 42.

In the fuel-cell diagnostic apparatus 20 of the embodiment, power generated by the fuel cell 122 is adjusted by the power adjustment unit 40. However, it is also appropriate that power generated by the fuel cell 122 be adjusted using the DC/DC converter 141 and the battery 142 of the power adjustment system 140 of the fuel cell system 120. In this case, it is appropriate that power generated by the fuel cell 122 be adjusted by outputting a switching control signal to the DC/DC converter 141 via the vehicle-operation control unit 160. It is also appropriate that power generated by the fuel cell 122 be consumed by the traction motor 144 of the power adjustment system 140 of the fuel cell system 120. In this case, as exemplified in FIG. 4, it is appropriate to employ the drive unit 45 or the like, which is capable of applying substantially the same load as in a running state of the vehicle 110 to driving wheels 114 thereof by means of load-applying rollers 46a and 46b. Thus, the fuel cell 122 can be diagnosed with the fuel cell system 120 installed in the vehicle 110 assuming substantially the same state as the state while the vehicle 110 is running.

The fuel-cell diagnostic apparatus 20 of the embodiment is designed to diagnose the state of the fuel cell 122 of the fuel cell system 120 installed in the vehicle 110. However, the fuel-cell diagnostic apparatus 20 may also be designed to diagnose a state of a fuel cell of a fuel cell system installed in a moving object other than the vehicle 110, such as an airplane and a ship. Alternatively, the fuel-cell diagnostic apparatus 20 may also be designed to diagnose a state of fuel cell which is not installed in a moving object.

In the fuel-cell diagnostic apparatus 20 of the embodiment includes the fuel gas supply unit 30, the power adjustment unit 40, the cooling unit 50, and the control unit 60, separately from the fuel cell system 120. However, the fuel gas supply system 130, the power adjustment system 140, the cooling system 150, or the vehicle-operation control unit 160 of the fuel cell system 120 may function as each portion of the fuel-cell diagnostic apparatus 20 according to the embodiment. In other words, the fuel cell system 120 may have functions of the fuel-cell diagnostic apparatus 20 according to the embodiment.

In the embodiment, the fuel-cell diagnostic apparatus 20 has been described, which diagnoses the state of the fuel cell based on a change in the operational state of the fuel cell that is detected when the fuel cell is operated according to the predetermined operation patterns. Obviously, however, the invention can be applied to a diagnostic method for a fuel cell.

Although the embodiment of the invention has been described, it is to be understood that the invention is not limited to the embodiment, and the invention can be realized in various embodiments without departing from the true spirit of the invention

What is claimed is:
1. A diagnostic apparatus located external to a vehicle for diagnosing a state of a fuel cell on the vehicle, comprising:
a fuel gas supply system fitting portion configured to connect to a fuel gas supply of the vehicle;
a cooling system fitting portion configured to connect to a cooling unit of the vehicle;
a power adjustment system fitting portion configured to connect to a power adjustment unit of the vehicle;
a control unit connector for connecting via a communication port to a vehicle-operation control unit of the vehicle;
a fuel gas supply unit,
a power adjusting unit;
a cooling unit;

a control unit configured to change the operation state of the fuel cell of the vehicle, the control unit comprising:
an operational state detecting portion which detects a change in an operational state of the fuel cell;
an operation control portion which controls the vehicle-operation control unit of the vehicle such that the fuel cell in the vehicle is operated according to at least one predetermined operation pattern of a plurality of predetermined operation patterns, the predetermined operation pattern to apply at least one predetermined operating condition to change an operational state of the fuel cell; and
a diagnostic portion which diagnoses the state of the fuel cell by comparing the change in the operational state of the fuel cell corresponding to the at least one predetermined operation pattern, which is detected by the operational state detecting portion when the fuel cell is operated by the operation control portion according to the at least one predetermined operation pattern, with a change in a normal operational state of a normally functioning fuel cell operated according to the same at least one predetermined operation pattern.

2. The diagnostic apparatus of claim 1, wherein the plurality of predetermined operation patterns includes an operation pattern for each of the gas supply device, the power adjusting unit, and the cooling device.

3. The diagnostic apparatus for a fuel cell according to claim 1, wherein a relationship between the state of the fuel cell, and presence or absence of an abnormality in the change in the operational state of the fuel cell corresponding to each of the operation patterns is set in the diagnostic portion in advance.

4. The diagnostic apparatus for a fuel cell according to claim 1, wherein the operational state detecting portion detects, as the operational state of the fuel cell, an output current and an output voltage of the fuel cell, and the diagnostic portion diagnoses the state of the fuel cell based on the detected output current and the detected output voltage.

5. The diagnostic apparatus for a fuel cell according to claim 1, wherein the operational state detecting portion detects, as the operational state of the fuel cell, an interterminal voltage and/or a cell voltage when the fuel cell is in an open state, and the diagnostic portion diagnoses the state of the fuel cell based on the detected interterminal voltage and/or the detected cell voltage.

6. The diagnostic apparatus for a fuel cell according to claim 1, wherein the gas supply device supplies a fuel gas and/or an oxidative gas to the fuel cell, and the operation control portion controls the gas supply device such that the fuel gas and/or the oxidative gas is supplied to the fuel cell according to a predetermined supply pattern of the plurality of predetermined operation patterns.

7. The diagnostic apparatus for a fuel cell according to claim 6, wherein the predetermined supply pattern includes one of a predetermined pattern of increasing/decreasing a flow amount of the fuel gas and/or the oxidative gas, a predetermined pattern of increasing/decreasing a supply pressure, and a predetermined pattern of increasing/decreasing a degree of humidification.

8. The diagnostic apparatus for a fuel cell according to claim 1, wherein the operational state detecting portion detects, as the operational state of the fuel cell, an internal resistance of the fuel cell, and the diagnostic portion diagnoses the state of the fuel cell based on the detected internal resistance.

9. The diagnostic apparatus for a fuel cell according to claim 1, wherein the plurality of predetermined operation patterns includes a predetermined temperature pattern; and the operation device further comprises:
a temperature adjusting device, controlled by the operation control portion, that adjusts an operation temperature of the fuel cell such that the fuel cell is operated according to the predetermined temperature pattern.

10. The diagnostic apparatus for a fuel cell according to claim 1, wherein the operational state detecting portion detects, as the operational state of the fuel cell, one of a temperature of the fuel cell, an exhaust gas temperature in a fuel gas system, and an exhaust gas temperature in an oxidative gas system, and the diagnostic portion diagnoses the state of the fuel cell based on one of the detected temperature of the fuel cell, the detected exhaust gas temperature in the fuel gas system, and the detected exhaust gas temperature in the oxidative gas system.

11. The diagnostic apparatus for a fuel cell according to claim 1, wherein the diagnostic portion determines that there is a mechanical failure or deterioration due to a secular change when an output voltage of the fuel cell is less than predetermined value in a case where the fuel cell is operated according to the at least one predetermined operation pattern.

12. The diagnostic apparatus for a fuel cell according to claim 1, which diagnoses a state of a fuel cell installed in a vehicle as a power source, wherein the operation control portion communicates with the operational state detecting portion that communicates with a vehicle detecting portion which is installed in the vehicle, and which detects a state as the operational state of the fuel cell.

13. The diagnostic apparatus for a fuel cell according to claim 12, wherein the power adjustment unit is connected to an output terminal of the fuel cell, and adjusts the power generated by the fuel cell by adsorbing or consuming the power.

14. The diagnostic apparatus for a fuel cell according to claim 12,
wherein the fuel gas supply unit supplies the fuel cell on the vehicle with a fuel gas that is used for power generation of the fuel cell, instead of a fuel gas supply system which is installed in the vehicle.

15. The diagnostic apparatus for a fuel cell according to claim 12,
wherein the cooling unit cools the fuel cell on the vehicle, instead of a cooling system which is installed in the vehicle.

16. A diagnostic method for diagnosing a state of a fuel cell on a vehicle, comprising the steps of:
connecting a diagnostic device to a vehicle-operation control unit, a fuel gas supply system, a cooling system and a power adjustment system of the vehicle;
(a) applying to the fuel cell at least one predetermined operation pattern of a plurality of predetermined operation patterns, the at least one predetermined operation pattern of the plurality of predetermined operation patterns to apply at least one predetermined operating condition to change an operational state of the vehicle fuel cell;
(b) detecting, at the diagnostic device located off of the vehicle, a change in an operational state of the fuel cell when the fuel cell is operated according to the at least one of the plurality of predetermined operation patterns;
(c) comparing, at the diagnostic device, the change in the operational state of the fuel cell corresponding to the at least one predetermined operation pattern, which is detected when the fuel cell is operated according to the at least one predetermined operation pattern, with a change in a normal operational state of the fuel cell corresponding to the at least one operation pattern; and (d) diagnosing, at the diagnostic device, and outputting as check results the state of the fuel cell based on the results of the comparison.

17. The diagnostic method for a fuel cell according to claim 16, wherein in the step (a), the fuel cell on the vehicle is operated according to one of a predetermined pattern of increasing/decreasing a flow amount of a fuel gas and/or an oxidative gas that is supplied to the fuel cell, a predetermined pattern of increasing/decreasing a supply pressure, and a predetermined pattern of increasing/decreasing a degree of humidification, as one of the operation patterns.

18. The diagnostic method for a fuel cell according to claim 16, wherein in the step (b) one of i) an output current and an output voltage of the fuel cell, ii) an interterminal voltage or a cell voltage when the fuel cell is in an open state, iii) an internal resistance of the fuel cell; iv) a temperature of the fuel cell, v) an exhaust gas temperature in a fuel gas system of the fuel cell, vi) and an exhaust gas temperature in an oxidative gas system of the fuel cell is detected as the change in the operational state.

19. The diagnostic method for a fuel cell according to claim 16, further comprising the steps of:

(e) changing the predetermined operation pattern to another one of the plurality of predetermined operation patterns and operating the fuel cell according to another one of the plurality of predetermined operation patterns; and (f) repeating steps (b) through (d).

20. A method for monitoring the operating state of a fuel cell in a vehicle, wherein the fuel cell includes a plurality of systems, comprising:

connecting an external diagnostic device to a vehicle-operation control unit, a fuel gas supply system, a cooling system and a power adjustment system of the vehicle, wherein the diagnostic device is located external to the vehicle;

outputting by the external diagnostic device connected to a fuel cell in a stopped vehicle, a predetermined operation pattern corresponding to one of the plurality of systems of the fuel cell, wherein the predetermined operation pattern changes the operation of the corresponding system of the fuel cell;

detecting, at the external diagnostic device, a change in the operating state of the fuel cell based on the predetermined operation pattern;

comparing the change in operating state of the fuel cell with a reference operating state of the fuel cell stored at the external diagnostic device, wherein the reference operating state corresponds to the operating state when a normally functioning fuel cell is operated according to the predetermined operation pattern corresponding to the one of the plurality of systems of the fuel cell; and outputting a diagnosis of the fuel cell based on the results of the comparison as check results in a table.

* * * * *